United States Patent [19]

Zorb et al.

[11] Patent Number: 4,691,727
[45] Date of Patent: Sep. 8, 1987

[54] FLOW CONDITIONING DEVICE RESETTER ASSEMBLY

[75] Inventors: Larry D. Zorb; L. Harvey Wicklund, both of Big Fork, Mont.

[73] Assignee: A. Y. McDonald Manufacturing Co., Dubuque, Iowa

[21] Appl. No.: 794,283

[22] Filed: Nov. 4, 1985

[51] Int. Cl.$^4$ .................. F16L 55/07; G01F 15/18
[52] U.S. Cl. ........................ 137/15; 73/201; 137/364; 285/30
[58] Field of Search ............... 73/201, 273, 756, 277, 73/199; 137/364, 368, 369, 370, 15; 385/30

[56] References Cited

U.S. PATENT DOCUMENTS

| 654,615 | 7/1900 | Estill | 73/201 |
| 1,107,532 | 8/1914 | Lofton | 73/201 |
| 1,969,432 | 8/1934 | Smith et al. | 73/201 X |
| 3,935,736 | 2/1976 | Enright | 73/201 |
| 3,990,299 | 11/1976 | Coffman | 73/199 |

FOREIGN PATENT DOCUMENTS

| 1122745 | 9/1956 | France | 73/201 |
| 756913 | 9/1956 | United Kingdom | 73/201 |

OTHER PUBLICATIONS

Watts Regulator Co. brochure, "Watts No. 7 Residential Dual Check Backflow Preventer", 6-81.
Ford Meter Box Company Catalog.
Zorwick Catalog, p. 9.

Primary Examiner—Martin P. Schwadron
Assistant Examiner—Stephen M. Hepperle
Attorney, Agent, or Firm—Wells, St. John & Roberts

[57] ABSTRACT

An assembly is described for securing a flow conditioning device such as a water meter between fittings of a fluid conduit along with another conditioning device such as a backflow preventer. The assembly includes a manifold including two fluid passageways pivotably connected to return bends that facilitate mounting of the meter along an axis parallel to the axis of the conduit. Fittings along the manifold enable one end of the manifold to be mounted to the conduit while the remaining end mounts the backflow preventer. The manifold ends are spaced such that the one manifold end and the remote end of the mounted backflow preventer are spaced by a distance substantially equal to the distance between mounting fittings on the meter. Additional provision is supplied for mounting of an accessory such as a pressure relief valve on the manifold. Adjustment of the meter position can be facilitated by pivoting the meter on the assembly about an adjustment axis defined between the manifold and the return bend sections connected thereto. The entire apparatus can be installed along with the additional flow conditioning devices within a confined area such as a meter pit without requiring modification of the fittings along the delivery conduit or the meter pit itself.

36 Claims, 7 Drawing Figures

FLOW CONDITIONING DEVICE RESETTER ASSEMBLY

FIELD OF THE INVENTION

The present invention relates to resetting of flow conditioning devices such as water flow meters in a fluid flow line, along with another device such as a backflow preventer.

BACKGROUND OF THE INVENTION

There is a growing need to provide water systems throughout the country with various safety devices to protect individual users from hazards such as contaminated backflow and dangerous pressure situations. Various flow conditioning devices are available for attachment in water lines to avoid these hazards.

For example, serious and sometimes fatal conditions can occur when one water branch becomes overused. An instance has occurred where a water main, opened for fire-fighting purposes, produced such a heavy draw that a reverse flow occurred at a distant branch where a chemical pesticide was being used in conjunction with a water hose. The pesticide was consequently drawn into the water supply. Later, when the water main was closed off and normal pressure resumed, the poisoned water became available for use, not only to the residents previously using the pesticide, but also to other neighboring residences. The result was nearly catastrophic. The solution to the above situation is to simply place backflow preventer valves at each branch leading from a central water main. Backflow preventers will not allow reverse drainage of water lines that could otherwise siphon or suction hazardous materials into the main line. The difficulty comes in the placement of such preventers.

Many municipalities have come to the conclusion that backflow preventers are to be supplied and installed by the municipality rather than by individual homeowners. The preferred sight for installation, therefore, is along with each water meter typically supplied for each residence or place of business. These meters are often found in meter pits, mounted to cradles that enable removal of the meters for periodic testing and calibration. The pit diameter is seldom much larger than the meter cradle, so a serious problem has developed in proper placement of backflow preventers within meter pits. This problem has been addressed by the present inventors and is not believed to have been previously addressed in any prior reference known to the inventors.

Devices have been developed to reset flow meters. For example, U.S. Pat. No. 3,935,736 to Enright, discloses a meter setter that has the capacity of changing the elevational position of a flow meter from the bottom of a meter pit toward the top opening thereof. A version of this arrangement also includes provisions for mounting a pressure control valve. However, mounting of these devices cannot occur without substantially changing the elevational position of the water meter. Furthermore, the flow path of the water is substantially obstructed by a number of bends as it flows about a tortuous path through the pressure regulating device and water meter.

The present inventors have previously developed a resetting yoke assembly which will accommodate a meter and auxiliary equipment such as a backflow preventer and pressure regulator. However, this equipment was designed for use outside confined areas, as the yoke design occupied a considerable space and could not be adequately mounted within a pit.

There remains a need to enable resetting of a flow meter along with an auxiliary device such as a backflow preventer while minimizing interruption of fluid flow and doing so in a space no larger than that previously occupied by the meter. The device disclosed herein by the present inventors accomplishes this objective and, additionally, does so with additional capabilities of mounting an additional conditioning device such as a pressure relief valve that has also been found desirable as a safety provision in many municipalities.

Other meter resetting devices have been provided on the marketplace but are intended primarily for use in situations where there is ample space available for resetting the meters. Even so, in many of these situations, no provision is made for simultaneously mounting a safety device such as a backflow preventer, especially with the meter being carried parallel to the existing water line.

BRIEF DESCRIPTION OF THE DRAWINGS

A preferred form of the present invention is illustrated in the accompanying drawings in which.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

The present invention deals generally with providing apparatus by which additional flow conditioning devices can be added to an existing flow line. A particlar application will be discussed primarily in this description. However, it should be understood that other uses for the present arrangement are conceivable and fall within the scope of the appended claims.

For purposes of this description, several "flow conditioning" devices will be discussed. The particular devices discussed herein include a water meter 11, a back flow prevention valve 12, and a pressure relief valve 13. These three items are considered broadly within this specification as "flow conditioning" devices. This term is also to be taken as encompassing other forms of conditioning devices, it being understood that the valves and meter disclosed above are simply exemplary of such devices.

It is additionally understood that though primary use of the present assembly will be in existing water lines within meter pits, other applications are envisioned as well. For example, the present arrangement may also be utilized for gas flow lines and associated "flow conditioning devices". Another area of potential use is within liquid chemical or petroleum lines.

Figure 4:
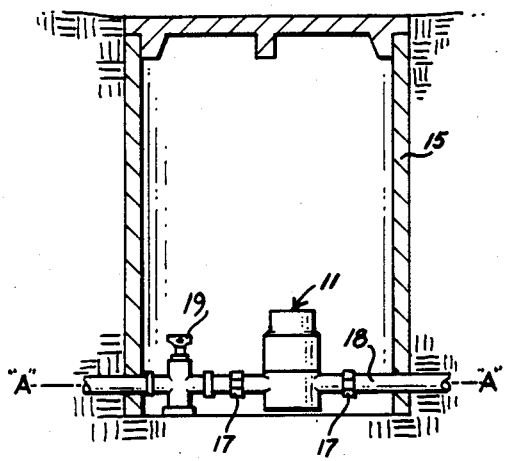
FIG. 4 is a view of a prior art arrangement showing a meter pit and typical meter installation.

In order to gain a proper understanding for the present assembly, reference will first be drawn to the conventional prior art arrangement shown in FIG. 4 of the drawings. FIG. 4 shows a meter pit 15 that is set into the ground surface for the purpose of supporting a water flow meter 11 between coaxial fittings 17 of a fluid conduit or pipe 18. The conduit enters and leaves the meter pit on a single axis "A".

The fittings 17 found within the pit 15 are spaced apart by a distance sufficient to receive opposed ends of the flow meter 11. There is typically insufficient room for additional fittings or devices other than a flow control valve 19. Flow control valve 19 is ordinarily provided on the water main side of the meter to enable workers to shut off the water supply and remove the meter from the fittings for testing, calibration, or replacement.

Obviously, there is very little room within the meter pit 15 in which to mount accessories other than those just described above. The fittings 17 are spaced only far enough apart to receive the flow meter 11. It is the function of the present invention to enable insertion and mounting of an auxiliary device such as the pressure relief valve 13 or back flow prevention valve 12, or both, within the confined area normally occupied by the meter 11. Various examples of such installations utilizing the present assembly are shown in FIGS. 2, 3, and 5-7. The apparatus described below facilitates these various mounting arrangements.

A basic component of the present invention is a manifold means generally shown at 23. The manifold means 23 includes two separate open oversize passageways extending from ends 24 to remote ends 29, 32 situated on an axis parallel to the axis of the water line 18. The passageways are oversize to reduce friction loss.

The manifold means 23 includes ends 24 provided with mounting threads 25. The threads 25 and the axial space therebetween function as means for mounting the backflow prevention valve 12 and the manifold itself between the conduit fittings 17. The ends 24 are therefore coaxial and threaded the same as the opposed ends of the water flow meter 11. The distance between the ends 24, however, is substantially less than the distance between the fittings 17. In fact, the distance is sufficient to enable mounting of a backflow preventer 12 between one of the ends 24 and one of the fittings 17.

It may be noted at this point that either of the ends 24 can be utilized to mount the backflow preventer. The distance between the remaining end 24 and the remote end of the backflow preventer will remain unchanged. This distance will always remain a distance substantially equivalent to the distance between opposed ends of the water meter 11.

It is also well to point out that the present assembly can be utilized in situations where other forms of fittings 17 are provided along the length of the conduit 18. Various meter cradle arrangements can be utilized and, in fact, are preferred since they enable easy access to the meter and associated assembly as will be discussed in further detail below.

Figure 3:
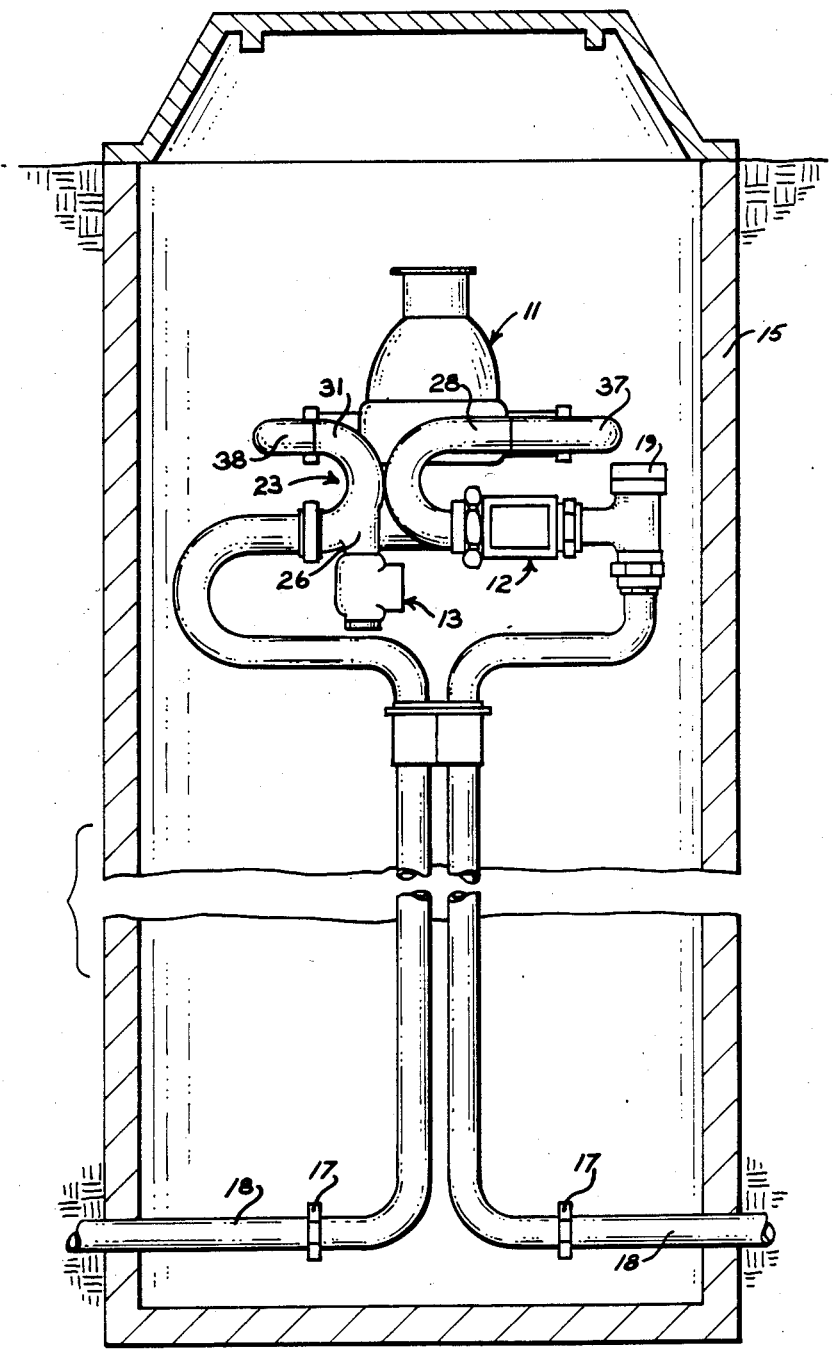
FIG. 3 is a view showing the present mounting device used in conjunction with a backflow preventer, pressure relief valve, and water meter on a "high rise" connector arrangement.
Figure 6:
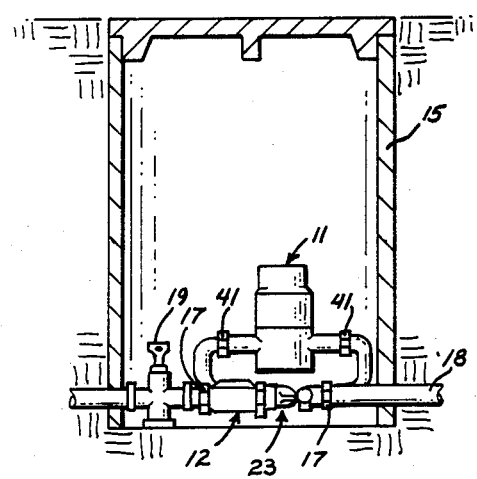
FIG. 6 is a view similar to FIG. 5 only showing an arrangement by which a pressure relief valve is also installed with the meter and backflow preventer.
Figure 7:
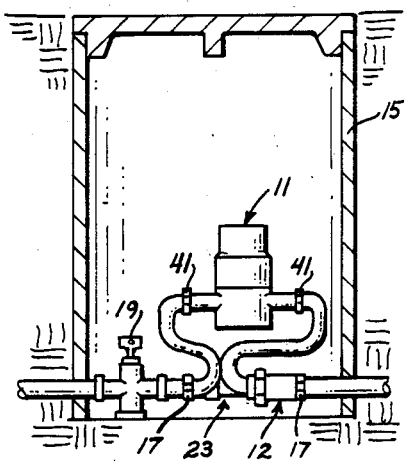
FIG. 7 is a view similar to FIG. 5 only showing the meter in an elevated condition.

The manifold also includes a means 26 for mounting an auxiliary device such as the presssure relief valve 13. Means 26 may be provided in the form of a boss or access protrusion extending from the manifold and communicating openly with one of the passages therein. The boss can be drilled and tapped to receive a threaded component such as the fitting end of a pressure relief valve. The valve can be utilized in mounting arrangements such as shown in FIGS. 3 and 6.

One of the complete passages through the manifold means may be more specifically described as a first conduit section 28 extending from one of the first ends 24 to a remote end 29 situated along an axis "C". The remote end 29 will face in a direction opposite to that of the associated manifold end 24. A second conduit section constitutes the remaining complete passage through the manifold. Second conduit section 31 extends from the remaining open first end 24 to a remote end 32. End 32 faces in a direction opposite its associated manifold end 24 and may be situated coaxially with the remote second end 29 of the first conduit section.

Figure 1:
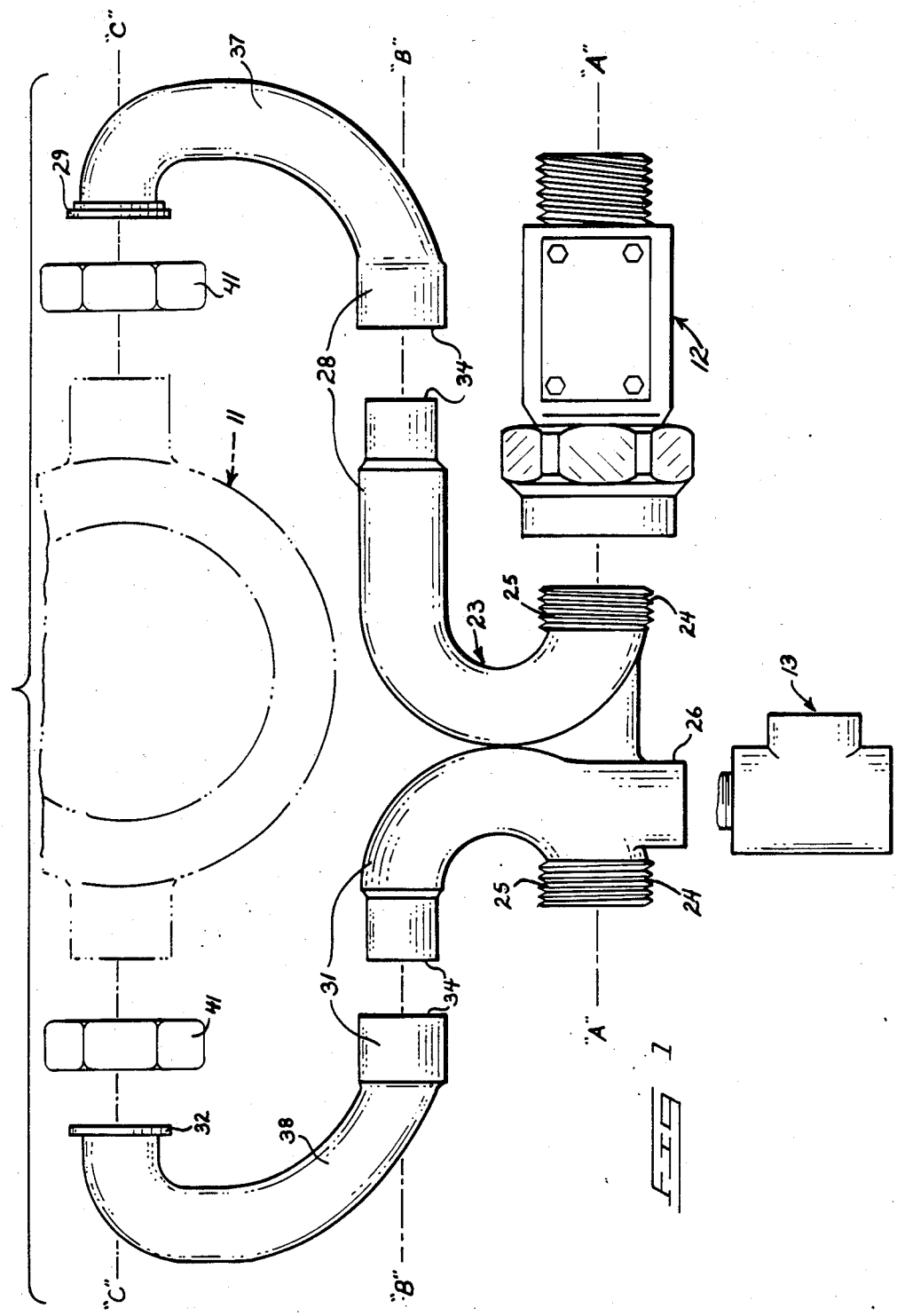
FIG. 1 is an exploded view illustrating components of the present invention along with associated flow control or conditioning devices.
Figure 2:
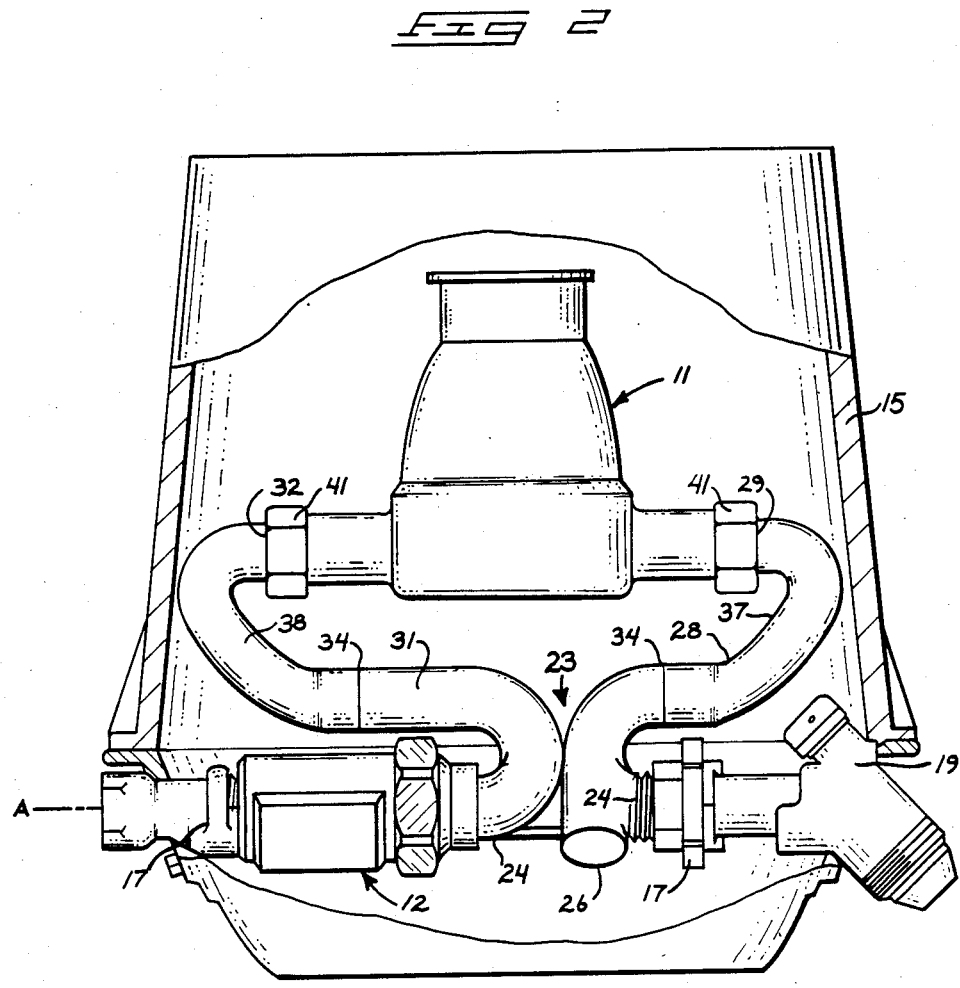
FIG. 2 is a partially fragmented view of the present invention shown within a meter pit and having a meter and backflow preventer attached thereto.

The conduit sections may be separable along the manifold passageways as shown in FIG. 1. The outward loose sections of the conduits may be described as first and second return bend sections 37, 38. The return bend sections 37 and 38 are substantially U-shaped tubes mountable to the remainder of the manifold. The tubes are mounted by pivot joints 34 that facilitate adjustment about an adjustment axis "B". The pivot joints 34 enable selection of the final meter positions as indicated in FIGS. 2, 3, and 5-7.

The manifold including return bend sections 37, 38 is preferably formed of brass, copper, or other material that can readily be secured at the joints 34. It is preferred that the pivot joints 34 be secured by solder once the desired position for the meter and remaining attached devices is obtained.

The return bend sections 37, 38, extend to the ends 29, 32 which provide remote conditioning device mounting fittings 41. The fittings 41 face one another coaxially along axis "C" (when properly positioned) and are spaced apart axially by a distance sufficient to receive the opposed ends of a flow meter 11. The fittings 41 are preferably provided at these ends to facilitate mounting of the flow meter 11.

It is important to note the relationship of the first and second conduit sections 28, 31 and the first and second return bend sections 37, 38. One of the conduit sections is longer along the adjustment axis "B" than the remaining section. This facilitates use of return bend sections 37, 38 of substantially identical configurations. The return bend sections can therefore be easily manufactured and may be interchangeable in use.

It is further noteworthy that the first and second conduits do not have equal axial spacings between their first and second ends. The axial spacing between the ends 24 and 29 of the first conduit 28 are herein termed the first conduit axial spacing distance. The axial spacing between the ends 24 and 32 of second conduit 31 are herein termed the second conduit axial spacing distance. The axial spacing distance for the first conduit 28 is substantially longer than the axial spacing for the second conduit 31. This preferred longer axial spacing between the ends of the first conduit allows room for the backflow preventer 12 to be preferably connected to the first end of the first conduit 28 while maintaining the compact relationship, thus allowing the meter resetter and attached flow conditioning devices to be installed within confined meter pits.

The fittings 41 are situated along axis "C" which is parallel to the adjustment axis "B" and the conduit axis "A". Axis "C" is adjustable by means of the pivot joints 34 about the adjustment axis "B". This facilitates the different positions for mounting the meter as indicated in the accompanying drawings. The same fittings, manifold 23, and bend sections 37 and 38 are used in each of the indicated positions.

Figure 5:
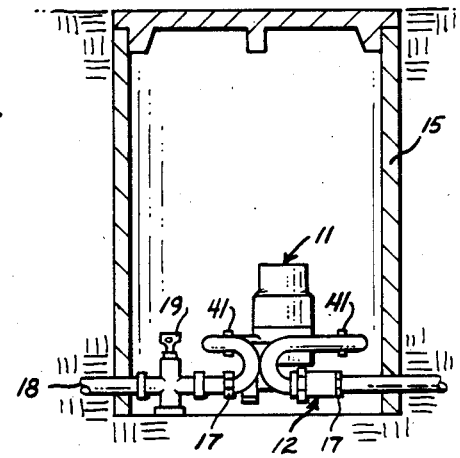
FIG. 5 is a view similar to FIG. 4 only showing the present assembly arranged within the pit and mounting a meter and backflow preventer.

FIGS. 3, 5 and 6 show embodiments wherein the meter resetting assembly is constructed to minimize the space required for mounting the assembly. In such embodiments the intermediate or adjustment axis (B—B in FIG. 1) does not lie within a first plane including the mainline axis (A—A) and the reset axis (C—C). The arrangements of FIGS. 3, 5 and 6 and similar arrangements instead involve displacement of the conduits transversely outward or lateral to such a plane defined by or approximated by the main line and reset axes, and associated with the mainline and remote ends of the conduits 24, 29 and 32, respectively. This transverse or lateral extension of the conduits from the first plane allows the length of the conduits to be distributed over a tortuous or convoluted path between the open ends. This arrangement reduces the spacing distance between the main line and reset axes thus reducing the overall size of the unit and enhancing its ability to be inserted and mounted within a confined meter pit. Both conduits advantageously extend outward along the same side of the first plane.

The preferred embodiments of FIGS. 3, 5, and 6 can advantageously be further described by a second plane which is approximately defined by the first or main line axis (A—A in FIG. 1) and the intermediate axis (B—B in FIG. 1). This second plane substantially defines the manifold piece 23 to be approximately planar along centers of flow of the portions of the first and second conduits formed by manifold piece 23. A third plane is approximately defined by the intermediate axis and the reset axis (C—C in FIG. 1). This third plane advantageously approximates the center of flow through the return bend portions 37 and 38 of first and second conduits 28 and 31.

Installation of the present assembly is accomplished with relative ease once the meter 11 has been removed from its original position mounted between the fittings 17 of the fluid flow conduit 18 (as shown in FIG. 4). The first step, of course, is simply to remove the flow meter 11.

This is done by first turning the valve 19 to its "off" position, thereby cutting off flow through the meter. The fittings 17 are then loosened and the meter lifted from the pit.

The meter can now be remounted between fittings 41 of the return bends 37 and 38. The backflow preventer can also be secured to appropriate threads 25 on one of the manifold ends 24. The complete assembly can then be again lowered into the pit and positioned in relation to the conduit fittings 17. The exposed, remote end of the backflow preventer is then attached to one of the fittings 17 and the remaining manifold end 24 is attached to the remaining fitting 17. This completes installation.

The backflow preventer and meter are now mounted within the pit where the meter was previously mounted. The meter is situated in an orientation parallel with its original position so the face can be easily read from the access opening of the meter pit.

The pressure relief valve 13 can also be added during assembly. This is accomplished simply by drilling and tapping the auxiliary device mounting means 26. Alternatively, the assembly can be produced with the mounting means 26 tapped and ready to receive the pressure relief valve 13.

It is important to note that the present assembly along with the meter, backflow preventer, and pressure relief valve (if utilized) are mounted as a unit between the conduit fittings 17. This is a distinct advantage since all the devices can be removed as a unit along with the present assembly from between fittings 17 in the same manner as the meter was previously removable for testing and calibration. The meter can be tested and calibrated with the present assembly secured thereto, or may be removed for separate testing or calibration. Additional testing can be completed to assure proper operation of the backflow preventer and pressure relief valve if such testing is desired. If adjustment or replacement is required, this step is accomplished simply and easily at the test bench, as opposed to requiring further frustrating and fatiguing operations within the meter pit. When testing and calibration or repairs are complete, the entire assembly can be remounted to the fittings in the same manner by which the meter was previously mounted.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A resetting device for mounting a first flow conditioning device along a remote axis spaced from and substantially parallel to a main line axis defined by main line pipes, and for allowing a second flow conditioning device to be mounted between the resetting device and a main line pipe; comprising:

a first conduit having a first opening along a first axis, and a second opening along a reset axis;

a second conduit having a first opening along said first axis, and a second opening along said reset axis;

said first openings of the first and second conduits being spaced by a first axial spacing along the first axis; said second openings of the first and second conduits being spaced by a second axial spacing along the reset axis which is substantially greater than said first axial spacing; said first opening of the first conduit being spaced axially further from the second opening of the first conduit than an axial spacing between the first and second openings of the second conduit; said first openings being axially spaced between the axial positions of said second openings of the first and second conduits;

said first axis and said reset axis being substantially parallel and defining a first plane; said first and second conduits running laterally outward from said first plane along intermediate portions thereof with the conduits convoluting between the first and second openings thereof;

said first openings of the first and second conduits being outwardly facing in opposing directions, and said second openings of the first and second conduits being inwardly facing towards one another; and in which a connection spacing between a first opening of the first or second conduits and a distal opening of the second flow conditioning device is approximately equal to said second axial spacing between the second openings, when the second flow conditioning device is connected to a first opening.

2. The resetting device of claim 1 further comprising detachable fittings at said first and second openings of the first and second conduits.

3. The resetting device of claim 1 wherein said first openings face outwardly in opposing directions along the first axis, and said second openings face inwardly toward one another along said reset axis.

4. The resetting device of claim 1 wherein said first opening of the first conduit is positioned axially between said second openings.

5. The resetting device of claim 4 wherein said first and second conduits are each provided with pivotable joints at locations intermediate to the first and second openings.

6. The resetting device of claim 4 wherein said first and second conduits are each provided with joints at locations intermediate to the first and second openings thereof.

7. The resetting device of claim 6 wherein said joints are formed by coaxially interengaging portions of the respective first and second conduits along a second axis substantially parallel to said first and reset axes, and spaced from said plane.

8. The resetting device of claim 7 wherein the first and second conduits are rigidly connected together adjacent said first openings of the first and second conduit to form a manifold piece forming the first and second conduits between the first openings and said joints.

9. The resetting device of claim 6 wherein the first and second conduits are rigidly connected together adjacent said first openings of the first and second conduit to form a manifold piece forming the first and second conduits between the first openings and said joints.

10. The resetting device of claim 9 wherein said manifold piece lies substantially in a second plane approximately passing through the first openings of the first and second conduits and portions of the first and second conduits formed by said manifold piece.

11. The resetting device of claim 10 wherein the first and second conduits extend laterally from said first axis along the same side of said first plane.

12. The resetting device of claim 1 wherein the axial positions of said first openings of the first and second conduits are positioned inwardly of said second openings.

13. The resetting device of claim 1 further comprising a second flow conditioning device connectible to the first opening of the second conduit to produce a connection spacing between the first opening of the second conduit and a distal opening of the second flow conditioning device which is approximately equal to said second axial spacing between the second openings.

14. The resetting device of claim 1 wherein intermediate portions of the first and second conduits define an intermediate axis substantially parallel to the first axis and the reset axis; and wherein a second plane defined by the first and intermediate axes intersects with a third plane defined by the reset and intermediate axes with transverse relationship between said second and third planes.

15. A resetting device for mounting a first flow conditioning device along a remote axis spaced from and substantially parallel to a main line axis defined between main line pipes which are axially spaced for mounting said first flow conditioning device therebetween, and for allowing a second flow conditioning device to be mounted between the resetting device and a main line pipe along the main line axis, comprising:

a first conduit having a first open end which faces outwardly along a first axis, and a second open end which faces inwardly along a reset axis approximately parallel to said first axis; said first open end being spaced inwardly from said second open end a first conduit axial spacing distance;

a second conduit having a first open end which faces outwardly along said first axis, and a second open end which faces inwardly along said reset axis in facing relationship to the second open end of the first conduit and spaced therefrom a first flow conditioning device mounting spacing; said first open end of the second conduit being spaced inwardly from the second open end of the second conduit by a second conduit axial spacing distance which is substantially less than said first conduit axial spacing distance;

said first axis and said reset axis approximately defining a first plane; said first and second conduits running laterally outward from said first plane along intermediate portions thereof with the conduits convoluting between the first and second openings thereof;

whereby a second flow conditioning device can be connected to the first open end of the first conduit and fit within the overall length of the resetting device because the first conduit axial spacing distance is substantially greater than the second conduit axial spacing distance; and said second flow conditioning device connected to the first open end of the first conduit in series therewith; the axial spacing between the first open end of the second conduit and an outwardly facing open end of the second flow conditioning device being approximately equal to said first flow conditioning device mounting spacing.

16. The resetting device of claim 15 wherein the resetting device is adapted to mount a fluid flow meter as the first flow conditioning device, and wherein the second flow conditioning device is a backflow prevention device.

17. The resetting device of claim 15 wherein the first and second open ends of the first and second conduits are provided with detachable connection fittings.

18. The resetting device of claim 15 wherein the open first open ends of the first and second conduits are provided with male screw thread connection fittings and the second open ends of the first and second conduits are provided with female screw thread connection fittings.

19. The resetting device of claim 15 wherein the first and second conduits are rigidly connected together adjacent the first open ends.

20. The resetting device of claim 15 wherein the first and second conduits are each provided with joints at locations intermediate to the first and second open ends thereof.

21. The resetting device of claim 20 wherein the joints are formed by coaxially interengaging portions of the first and second conduits which define a common second axis substantially parallel to said first axis and said reset axis; whereby the spacing between the first axis and reset axis can be adjusted by pivotal motion between the coaxially interengaging portions of the first and second conduits at said joints.

22. The resetting device of claim 21 wherein the first and second conduits are rigidly connected adjacent the first open ends thereof, to form a manifold piece forming the first and second conduits between the first open ends thereof and said joints.

23. The resetting device of claim 15 wherein intermediate portions of the first and second conduits define an intermediate axis substantially parallel to the first axis and the reset axis; and wherein a second plane defined by the first and intermediate axes intersects with a third plane defined by the reset and intermediate axes with transverse relationship between said second and third planes which is not coplanar.

24. The resetting device of claim 15 wherein intermediate portions of the first and second conduits define a intermediate axis substantially parallel to the first axis and the reset axis; and wherein a second plane defined by the first and intermediate axes intersects with a third plane defined by the reset and intermediate axes with transverse relationship between said second and third planes.

25. A resetting device for mounting a first flow conditioning device along a remote axis spaced from and substantially parallel to a main line axis defined between inlet and outlet main line pipes which are aligned and axially spaced and adapted for mounting said first flow conditioning device therebetween, and for allowing a second flow conditioning device to be mounted between the resetting device and a main line pipe along the main line axis, comprising:

a manifold element integrally forming a first conduit portion and a second conduit portion;

said first conduit portion having a first opening which faces outwardly along a first axis, and an intermediate pivot joint opening which faces outwardly along an intermediate axis which is spaced from but substantially parallel to said first axis;

said second conduit portion having a first opening which faces outwardly along said first axis in a direction opposite from the first opening of the first conduit portion; said second conduit portion also having an intermediate pivot joint opening which faces outwardly along said intermediate axis in a direction opposite from the intermediate pivot joint opening of the first conduit portion;

a first conduit return bend portion having a return bend pivot joint opening which is pivotally and coaxially connectible to the first conduit portion of the manifold element at the intermediate pivot joint opening thereof; said first conduit return bend portion also having a first remote opening which faces inwardly along a reset axis which is substantially parallel to said first axis and said intermediate axis when assembled with the manifold element; said first remote opening being spaced axially outward from the first opening of the first conduit portion a first conduit axial spacing distance when said first conduit return bend portion is assembled with the manifold element at a pivot joint;

a second conduit return bend portion having a return bend pivot joint opening which is pivotally and coaxially connectible to the second conduit portion of the manifold element at the intermediate pivot joint opening thereof; said second conduit return bend portion having a second remote opening which faces inwardly along said reset axis in opposing and facing relationship to said first remote opening, when assembled with the manifold element; said second remote opening being spaced axially outward from the first opening of the second conduit portion a second conduit axial spacing distance when said second conduit return bend portion is assembled with the manifold element at a pivot joint;

said first conduit axial spacing distance being substantially greater than said second conduit axial spacing distance when the return bend portions are assembled with the manifold element;

said first axis and said reset axis being substantially parallel and approximately defining a first plane; said first and second conduits running laterally outward from said first plane along intermediate portions thereof with the conduits convoluting between the first and second openings thereof; and wherein the meter resetting device is adapted to mount a second flow conditioning device connectable at the first fitting of the first conduit means; said second flow conditioning device having a length which provides a distance between an open end thereof and a first opening of the second conduit, when assembled, which is approximately equal to an axial spacing of the first flow conditioning device.

26. The resetting device of claim 25 wherein the first and second conduit return bend portions are substantially the same and said first conduit portion of the manifold element extends axially a greater distance than the second conduit portion.

27. The resetting device of claim 25 wherein a second plane defined by said first and intermediate axes intersects with a third plane defined by said reset and intermediate axes with transverse relationship between said second and third planes.

28. The resetting device of claim 25 wherein said manifold piece lies substantially in a second plane approximately passing through the first openings of the first and second conduits and portions of the first and second conduits formed by said manifold piece.

29. The resetting device of claim 28 wherein the first and second conduits extend laterally from said first axis along the same side of said first plane.

30. A meter resetting device for mounting a meter having two fittings separated by a meter fittings spacing and a backflow preventing valve within a confined meter pit using main line couplings existing on ends of two main line pipes positioned within the meter pit along a common main line axis, comprising:

first and second conduit means each having a first fitting facing outwardly on a mainline axis and a second fitting facing inwardly on a reset axis parallel to said main line axis; the first fittings of the conduit means being spaced a distance approximately equal to said meter fittings spacing less an amount approximately equal to a backflow preventer length;

said second fittings of said conduit means being spaced a distance approximately equal to said meter fittings spacing;

at least said first fitting of the first conduit means being axially spaced within said second fittings with more axial distance between the first and second fittings of the first conduit than between the first and second fittings of the second conduit by an amount approximately equal to a backflow preventer length;

said first and second conduits running laterally outward from a plane containing the first axis and the reset axis to form convoluted flow paths between the first and second fittings of each of said conduits;

whereby a backflow preventer can be installed between a main line pipe and a first fitting of the meter resetting device along the main line axis, and a meter can be installed between the second fittings of the first and second conduits.

31. The meter resetting device of claim 30 further defined by said first and second conduits having first and second intermediate pivot joints along a pivot joint axis which allows pivotal motion which can adjust the spacing between the first axis and the reset axis.

32. The meter resetting device of claim 30 further comprising at least a pressure relief valve mounted to and communicating with one of said conduits.

33. The resetting device of claim 31 wherein portions of said first and second conduits adjacent the first fittings are formed by a manifold piece which lies substantially in a second plane approximately passing through the first openings of the first and second conduits and portions of the first and second conduits formed by said manifold piece.

34. The resetting device of claim 33 wherein the first and second conduits extend laterally from said first axis along the same side of said first plane.

35. The resetting device of claim 22 wherein intermediate portions of the first and second conduits define a second axis substantially parallel to a first axis and a reset axis; and wherein a second plane defined by the first and second axes intersects with a third plane defined by the reset and second axes with transverse relationship between said second and third planes.

36. A method for resetting a meter and adding a backflow preventer within a confined meter pit between existing main line pipes which extend into the meter pit in an approximately aligned relationship defining a main line axis; the main line pipes being separated by a meter fitting spacing; comprising:

removing a previously set meter from between the main line pipes;

obtaining a resetting device having first and second conduits; each of said conduits having a manifold end with outwardly facing fittings along a main line axis and a remote end with inwardly facing fittings along a reset axis, all with fittings adapted for detachable connection; the resetting device having said meter fitting spacing between the remote ends of the conduits and being adapted to detachably mount a meter therebetween; said resetting device further having said manifold ends spaced such that at least said manifold end of the first conduit lies axially between the remote ends; the remote and manifold ends of the first conduit being spaced substantially further apart in an axial direction than an axial spacing between the remote and manifold ends of the second conduit; the resetting device further having first and second conduits each running laterally outward from a plane including the remote ends and manifold ends with the conduits convoluting between the manifold ends and the remote ends;

connecting a backflow preventer to the manifold end of the first conduit leaving an unconnected distal end of the backflow preventer which is axially spaced from the manifold end of the second conduit by approximately said meter fitting spacing;

connecting a meter between the remote ends of the first and second conduits;

installing an assembly including at least the resetting device, and backflow preventer into the meter pit;

connecting the second conduit manifold end to a main line pipe using a fitting; and connecting the distal end of the backflow preventer to a main line pipe using a fitting.

* * * * *